US006947351B1

(12) United States Patent  (10) Patent No.: US 6,947,351 B1
Loth et al. (45) Date of Patent: Sep. 20, 2005

(54) WATCH EQUIPPED WITH MEANS FOR DETERMINING A LOCATION LONGITUDE

(75) Inventors: Eric A. Loth, Bienne (CH); Pierre-André Finazzi, La Chaux-de-Fonds (CH)

(73) Assignee: The British Masters SA, La Chaux-de-Fonds (CH)

( * ) Notice: Subject to any disclaimer, the term of this patent is extended or adjusted under 35 U.S.C. 154(b) by 0 days.

(21) Appl. No.: 09/743,127

(22) PCT Filed: Jun. 30, 1999

(86) PCT No.: PCT/CH99/00283

§ 371 (c)(1),
(2), (4) Date: Mar. 8, 2001

(87) PCT Pub. No.: WO00/02101

PCT Pub. Date: Jan. 13, 2000

(30) Foreign Application Priority Data

Jul. 6, 1998 (FR) .................................. 98 08712

(51) Int. Cl.[7] ....................... G04B 19/06; G04B 19/20; G04B 19/22; G04B 19/24
(52) U.S. Cl. ............................ 368/20; 368/21; 368/37; 368/228
(58) Field of Search ............................ 368/309, 15, 20, 368/21, 25, 27, 223, 77, 228, 232, 10, 37; 33/271; 235/78 R

(56) References Cited

U.S. PATENT DOCUMENTS

| 428,588 | A | * | 5/1890 | Barrett | 368/27 |
| 434,137 | A | * | 8/1890 | Plechawski | 368/25 |
| 2,032,462 | A | * | 3/1936 | Bean | 33/271 |
| 4,032,754 | A | * | 6/1977 | Ageton | 235/78 R |
| 4,387,999 | A | * | 6/1983 | Shelley | 368/15 |
| 4,487,511 | A | * | 12/1984 | Lucarelli | 368/15 |
| 4,681,460 | A | * | 7/1987 | Nishimura | 368/21 |
| 4,993,002 | A | * | 2/1991 | Kerr | 368/18 |
| 5,253,225 | A | * | 10/1993 | Vaucher | 368/20 |
| 5,982,710 | A | * | 11/1999 | Rawat et al. | 368/21 |
| 6,134,186 | A | * | 10/2000 | Jang | 368/27 |

* cited by examiner

Primary Examiner—Kamand Cuneo
Assistant Examiner—Jeanne-Marguerite Goodwin

(57) ABSTRACT

The invention concerns a watch equipped with means for determining a location longitude and a device for determining the sun's altitude above the horizon. Said watch comprises a mobile element (16) doing one full rotation in 12 hours and bearing a hour hand (24), and a dial (32). It comprises for this purpose a rotating ring (44) for reading longitude, bearing an index mark (47) and, therefrom, a scale (45) in degrees, extending from 0° to 90° on either side of the index mark and covering the ring (44) over its whole periphery. Moreover, the dial (32) is provided with a circular scale (33) for selecting a time zone, with a median point (35) corresponding to the dial top point and a graduation from 0 to +6 hours or −6 hours depending on the rotational direction.

12 Claims, 5 Drawing Sheets

WATCH EQUIPPED WITH MEANS FOR DETERMINING A LOCATION LONGITUDE

FIELD OF THE INVENTION

The present invention relates to a watch intended to define a location longitude.

BACKGROUND OF THE INVENTION

Such watches are well known to those skilled in the art. One of them is disclosed in Swiss Patent No. 184 338. It includes three hands each moving opposite a graduated circular dial. The hands and the dials are concentric. The first dial bears a scale each division of which corresponds to 1° of arc, placed opposite a hand completing one revolution in 40 minutes. The second dial bears a graduation of 36 divisions each of which corresponds to 10° of arc placed opposite a hand completing one revolution in 24 hours. The third dial bears a graduation of 60 divisions each corresponding to a minute of arc placed opposite a hand completing one revolution in four minutes of time. The watch further includes a ring for modifying the position of the dials in order to allow adjustment relative to the equation of time. The watch was, for example, intended for aviators to let them know their position. It permits precise determination of longitude, but is not convenient for reading the time. It must in fact remain adjusted to the time of the place of departure. Moreover, the hands rotate at an unusual angular speed.

French Patent No. 852 214 relates to a watch including two discs displaying the hour and the minute.

A third disc, which is concentric, allows longitude to be determined, insofar as the true time of the place considered is known.

German Patent No. 25 104 84 and U.S. Pat. No. 2,560,618 disclose devices for determining a location longitude and latitude. These devices cannot be associated with a watch.

Finally, French Patent No. 460 311 discloses an astronomical instrument allowing one to take bearings, track a star, etc.

Today, the GPS system allows the position of a location to be defined with much greater precision than that achieved with a conventional timepiece. People who have to know their position with precision can thus use this system without any problem. However, no means exist which are simple to use and allow explanation and understanding of what longitude is and how it can be determined with reference to time, and to the movement of the sun relative to the earth. In order to assure these functions, it is necessary to be able to use a commonly used object, involving simple and easily comprehensible manipulations which is easy to read.

BRIEF SUMMARY OF THE INVENTION

The present invention relates to a watch of common use, which includes a wheel completing one revolution in 12 hours and bearing an hour hand, a wheel completing one revolution in one hour and bearing a minute hand, and a dial. The main object of the invention is to allow the time to be read easily and a location longitude to be determined in a simple and easily comprehensible manner.

This object is achieved as a result of the fact that the watch according to the invention comprises a case (10) closed by a back cover (40), in which are disposed a wheel (16) completing one revolution in 12 hours and carrying an hour hand (24), a wheel (18) completing one revolution in one hour and carrying a minute hand (28), and a dial (32), characterised in that it further includes:

a rotatable ring (44) for reading longitude, bearing an origin (47) and, therefrom, a longitude scale (45) in degrees covering 180° over the periphery of the longitude scale (45), in that the dial (32) is equipped with a time zone scale (33) for selecting a time zone, with a median point (35) corresponding to the top point of the dial, the time zone scale (33) covering 12 hours over the periphery of the time zone scale (33), each hour on the time zone scale (33) representing 15° on the longitude scale (45), and, when the origin (47) is aligned with the median point (35), the value of a number on the longitude scale (45) being equal to an absolute value of the opposing hour mark on the time zone scale (33); and a calendar indicator (54) in polar co-ordinates, with an angular indication of the months and days of the year and a radial indication in the shape of a curve (50) relative to the equation of time, and an index (48) mounted to move in rotation opposite the calendar indicator (54) and bearing a reading scale (52) for determining the equation of time.

Advantageously, the scale of the rotatable ring, expressed in degrees, extends from 0° to 90°on either side of the origin, and the time zone scale, borne by the dial and intended for selecting a time zone, bears a graduation going from 0 to +6 hours or −6 hours from the median point, according to the rotational direction.

Since longitude is measured with a single hand, namely the hour hand, the longitude scale must be as large as possible. However, in a watch, the hour hand is generally the shortest. In order to overcome this drawback, the rotatable ring encircles the dial so as to provide the largest scale possible, and the hour hand is extended by an arrow up to the vicinity of the rotatable ring, its length being greater than that of the minute hand. Consequently, longitude can be read with great precision. Furthermore, the end of the hour hand is never masked by the minute hand It is thus possible to read longitude even when the minute hand is superposed on the hour hand.

In order to be able to define longitude with a certain precision, it is necessary to take account of the difference between mean time and true solar time, called the equation of time. For this purpose, in a particular embodiment, the watch includes a display surface in polar co-ordinates, with an angular indication of the months and days of the year and a radial indication in the form of a curve relative to the equation of time, and an index mounted so as to move in rotation opposite the display surface and bearing a reading scale for determining the equation of time. The index is advantageously mounted so as to pivot in the back cover of the watch.

In order to define longitude one had to know the angular displacement of the sun in its course from the temporal difference corresponding to the equation of time. In order to simplify reading, the index includes two diametrically opposite arms, one of which bears a scale in degrees of angle and the other a scale in minutes of time.

Longitude reading precision depends on that assured during the entry of the adjustment required by the equation of time. For this purpose, the rotatable ring includes indices defining fractions of degrees for values comprised between ±5° on either side of the origin.

Longitude reading precision may be improved by using the vernier principle. For this purpose, the dial and the rotatable ring on the one hand, the rotatable ring and the hour hand on the other hand each bear a scale to define two verniers respectively allowing the equation of time adjustment to be entered and longitude to be read in a more precise manner.

Determination of longitude requires knowledge of the orientation of the median plane. This information may be given, at least approximately, by a watch equipped with a solar compass, including a disc completing one revolution in 24 hours, in synchronism with the hour hand and bearing data relating to the cardinal points.

Defining the sun's meridian passage is difficult without a compass. However, the information given by a solar compass can only be approximate, as long as the location longitude is not known. The addition of a magnetic compass takes a lot of space and lacks precision, because of the shift between the magnetic pole and the geographical pole. In order to remove this difficulty, the present invention also relates to a device for determining the sun's altitude above the horizon. Indeed, by definition, the sun's meridian passage corresponds to its greatest altitude above the horizon.

One solution consists in using the gnomon principle, i.e., arranging a rod vertically and defining when the shadow is shortest. This method is uncertain, since if the rod is not perfectly vertical, this may result in a large difference between the moment when the shadow is shortest and the real meridian passage. There exist other means, for example the theodolite, for taking a more precise measurement. These means are however, voluminous and expensive.

Another object of the present invention is to allow the sun's altitude above the horizon to be determined, with inexpensive means of small dimensions which may even be integrated in a watch. The watch according to the invention is thus equipped with a device including a diaphragm for defining a light ray of small section and a frosted surface onto which the ray is projected.

In a particular embodiment, the device includes a body made of transparent material, of substantially prismatic shape, with two substantially parallel opposing faces and an oblique face connecting the two opposing faces and which includes a substantially central transparent slot, intended to let a light ray penetrate the body, surrounded by a opaque surface, in which the opposing faces are arranged so as to reflect the ray. In this device, one of the opposing faces includes a frosted surface and a scale opposite the surface, to evaluate the movement of the sun above the horizon. Such a solution certainly does not allow an absolute measurement of the sun's altitude; however the moment when it reaches its apogee can be defined with a good level of precision. This is made possible as a result of the fact that the sun ray is reflected several times inside the device, which allows the linear movement to be amplified and thus to be made perceptible.

Such a device associated with a watch could be quickly scratched depending upon the material used. This problem may be avoided by making it in tempered plate glass or sapphire.

In order for this device to fully fulfill its function, it is desirable for it to be permanently associated with the watch and able to be used simultaneously when the dial is read. The present invention thus also relates to a watch equipped with a wristband with which the device is associated.

BRIEF DESCRIPTION OF THE DRAWINGS

Other advantages and features of the invention will appear from the following description, made with reference to the annexed drawing, in which.

DETAILED DESCRIPTION OF PREFERRED EMBODIMENTS

Figure 3:
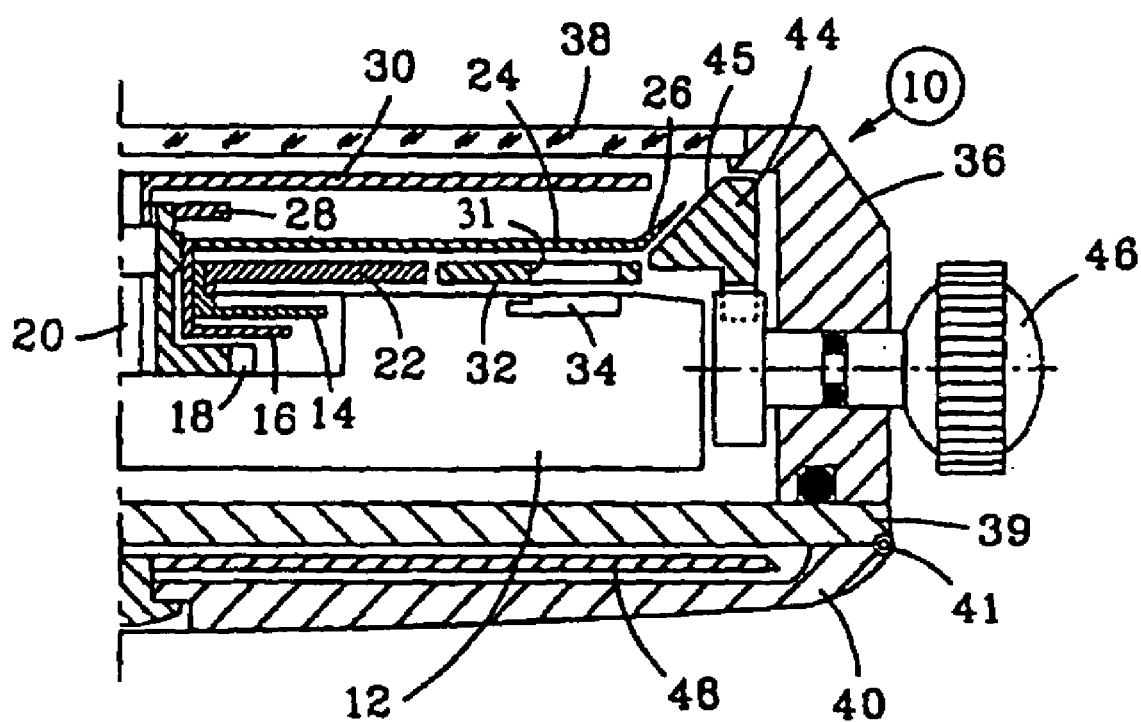
FIG. 3 is a partial view, in cross-section of the watch of FIGS. 1 and 2.

As can be seen most particularly in FIG. 3, the watch according to the invention includes a case 10, containing a watch movement 12 of entirely conventional design and equipped with wheels 14, 16, 18 and 20, shown schematically and respectively completing one revolution in 24 hours, 12 hours, 60 minutes and 60 seconds.

Each of these wheels carries a display member. More precisely, wheel 14 carries a disc 22, provided with diametrically opposite indications N-S (FIGS. 1 and 2), having a solar compass function, as will be explained hereinafter.

Wheel 16 carries an hour hand 24 completing, in a conventional manner, two revolutions per day. Hand 24 is provided with an arrow 26 the usefulness of which will be specified hereinafter. Wheels 18 and 20 respectively carry minute hand 28 and second hand 30.

Movement 12 further carries a dial 32 provided with a window 31 and a date disc 34 visible through said window 31.

Figure 1:
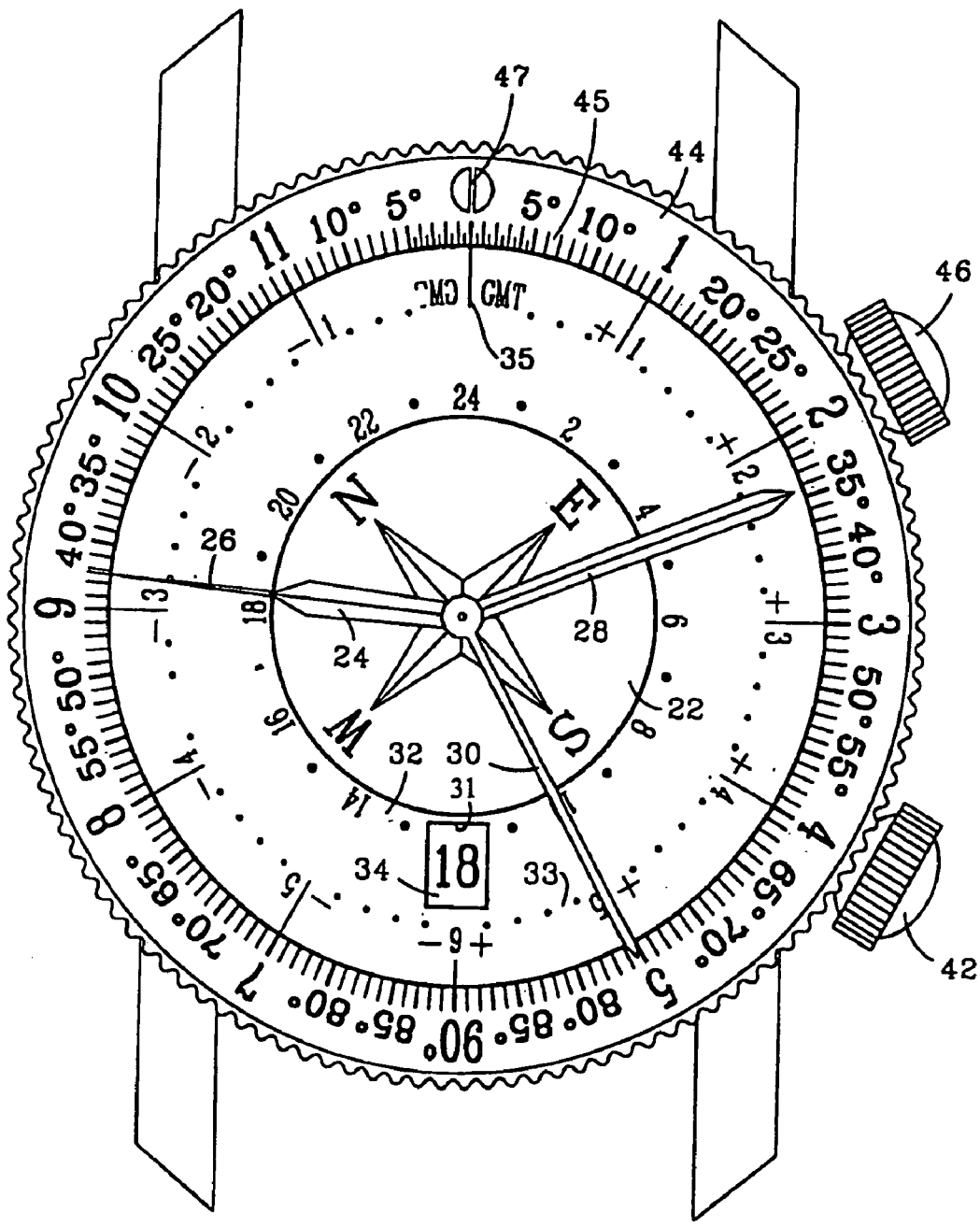
FIGS. 1 and 2 show, in plane, a watch according to the invention, displaying two different states.
Figure 2:
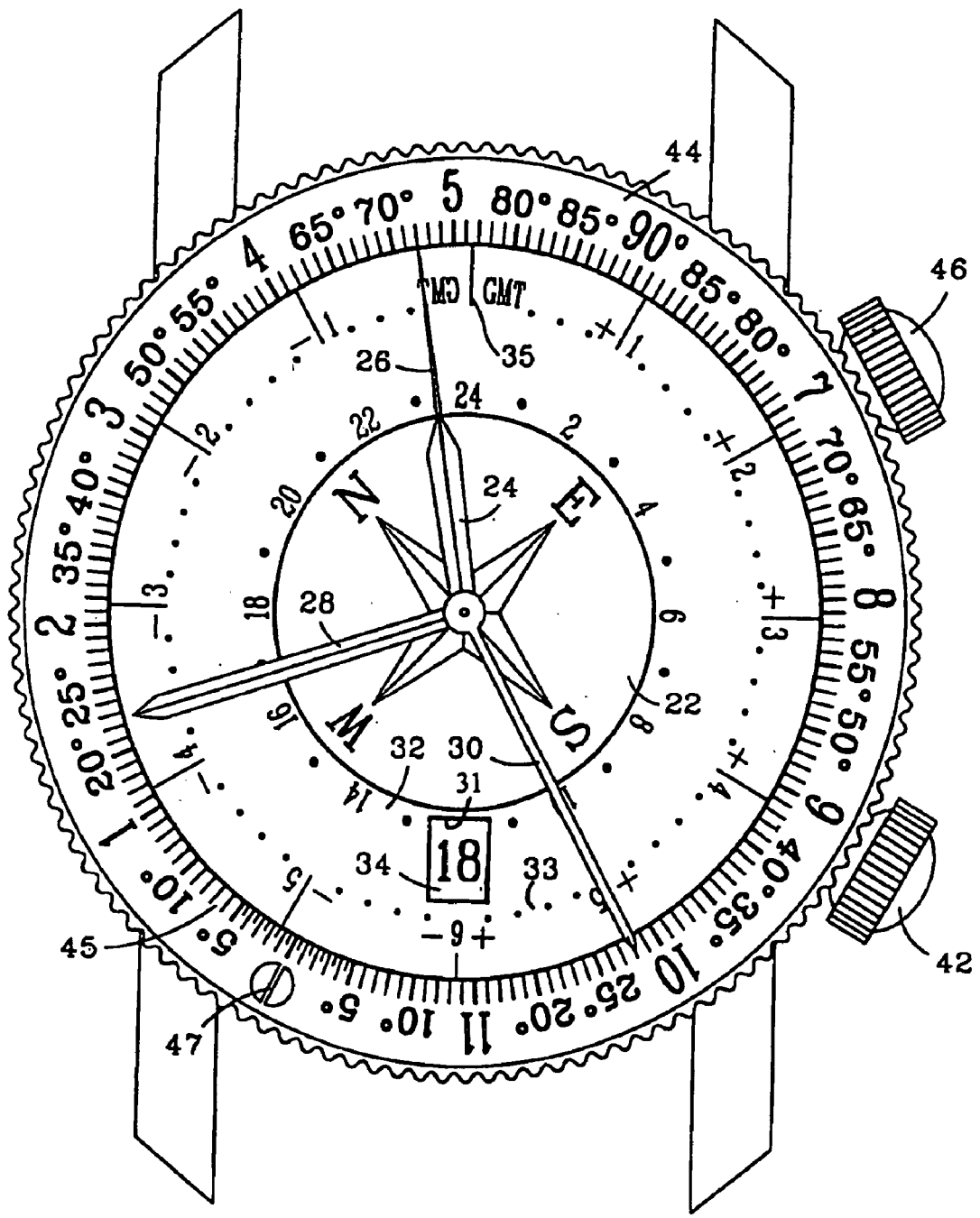

Dial 32 includes time zone scale 33 including, at midday, the letters GMT at the median point 35 and, on either side, distributed over a semi-circle, the numbers 1 to 6, wit the + sign in the clockwise direction and − in the anticlockwise direction (FIGS. 1 and 2). Time zone scale 33 specifies the time zone to which the displayed time relates.

Case 10 is provided, in a conventional manner, with a middle part 36, a crystal 38, a back cover including two portions 39 and 40 connected to each other by a hinge 41, and a time-setting stem 42. It further carries a rotatable ring 44 and a crown 46 for controlling rotatable ring 44. The latter is provided with a longitude scale 45, in degrees, starting from an origin 47 and extending over a semi-circle, both in the clockwise and anticlockwise direction, each semi-circle corresponding to 90° of longitude.

In a variant, it is also possible to have asymmetrical scales. In each case, rotatable ring 44 bears a longitude scale 45 covering 180° over the whole of its periphery and time zone scale 33 covering 12 hours over the periphery of the time zone scale 33, each hour of the time zone scale 33 representing 15° on the degree the longitude scale 45. When the origin 47 is aligned with the median point 35, the value of a number on the longitude scale 45 is equal to an absolute value of the opposing hour mark on the time zone scale 33.

Figure 4:
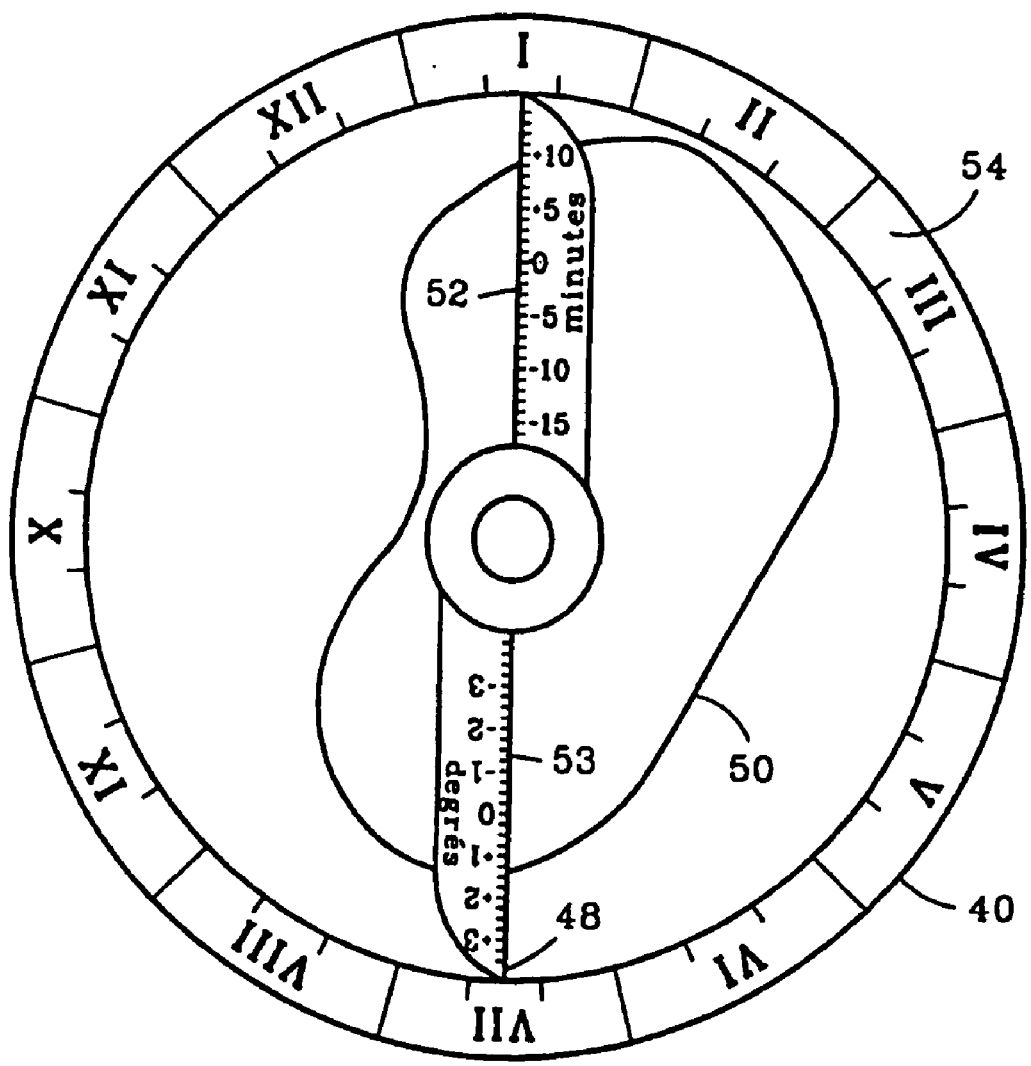
FIG. 4 shows, in plane, the back cover of the watch of FIGS. 1 to 3.

As can be seen schematically in FIG. 4, portion 40 of the back cover bears an index 48, mounted so as pivot in a sliding manner and a stamped curve 50, corresponding to the equation of time shown in polar co-ordinates. Index 48 includes two arms respectively provided with a minute scale 52 graduated in minutes and a degree scale 53 graduated in degrees of arc. The back cover bears a calendar indication 54 engraved on a circle encircling stamped curve 50 and able to be swept by the end of index 48. The date thus corresponds to the angular co-ordinate and the equation of time to the radial co-ordinate.

In order to access this data, the user opens the back cover by raising portion 40. This may advantageously occur by means of a so-called case spring system, such as used in Lepine type watches.

The watch as described and shown, permits several complementary functions to the conventional time functions, namely approximate determination of the meridian plane, longitude definition and definition of the equation of time.

The meridian plane, which is a vertical plane passing through the north-south axis at a given location, is indicated approximately by the N-S indications carried by disc 22 when hour hand 24 is pointed towards the sun. Such a construction is called a solar compass.

For the meridian plane to be defined precisely, the watch would have to display the solar time of the location and take account of the equation of time. The indication given is thus not sufficient to measure longitude.

Figure 5:
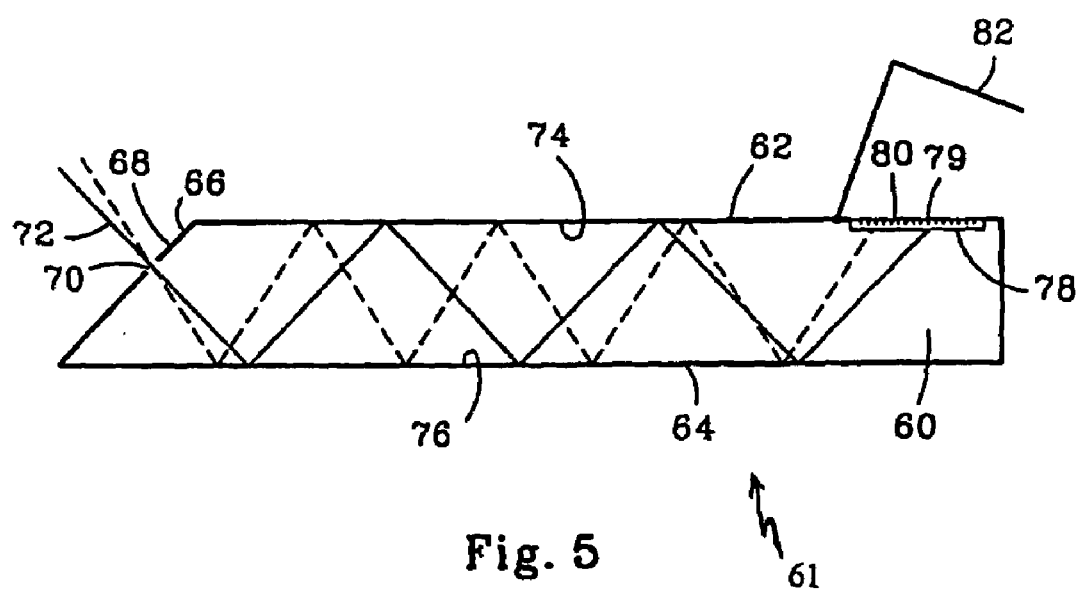
FIG. 5 illustrates a device for measuring the sun's altitude above the horizon.

The prism device 61 shown in FIG. 5 allows the sun's apogee to be determined with a precision comparable to that obtained in longitude determination. The prism device 61 includes a body of prismatic shape 60 with two parallel faces 62 (top) and 64 (bottom) and an oblique face 66 connecting the two parallel faces 62 and 64.

Oblique face 66 is partially covered with an opaque layer 68, defining a substantially central slot 70 having a diaphragm function. This slot 70 is intended to let a light ray shown at 72 and coming from the sun pass through it. Opposing faces 62 and 64 are arranged so as to reflect light ray 72. They carry, for example, metal layers 74 and 76. The top face 62 is only partially covered. It includes a frosted surface 78, at its end opposite to oblique face 66, through which ray 72 exits body 60 and forms an image 79 in a point dependent on the sun's altitude above the horizon. A graduated scale 80 is placed beside frosted surface 78, so as to be able to detect the movement of the image 79 on the frosted surface 78. A sun shield 82 partially masks frosted surface 78, so that image 79 of slot 70 is visible on frosted surface 78. The prism device 61 is advantageously made of tempered plate glass or sapphire, in order to prevent it being scratched.

By sizing the prism device 61 so that it has a thickness of 3 mm for a length of approximately 20 mm, with an inclination of oblique face 66 of close to 45 degrees, a variation in the sun's altitude of 1 degree substantially corresponds to a movement of image 79 of 1 mm.

Other similar solutions may be envisaged to perform this function. The device will however include at least one slot to define a light ray of adequate section, a frosted surface onto which the light is projected and an index mark for evaluating the movement of the sun. The presence of a reflective surface in the path comprised between the slot and the frosted surface allows a more compact structure to be obtained. In order to prevent the sun's illumination making it difficult to perceive the image on the frosted surface, it is advantageous to provide a sun shield.

Prior to explaining how longitude is determined, it has to be understood what the equation of time is. It is known that the time between two passes of the sun in the meridian plane varies from one day to another. The difference with respect to mean time as measured by a watch is called the equation of time. This difference corresponds to stamped curve 50 and can be read by means of graduated scale 52.

In FIG. 1, longitude is the angle formed by two planes passing through the poles, one through Greenwich, the other through the location being considered. Knowing that the relative movement of the sun and the earth has a periodicity of 24 hours, one need only know the sun's meridian passage for the location being considered, expressed in Greenwich time, then convert such time into an angle—24 hours corresponding to 360 degrees—to define longitude. In order to do this, one must however know to which time zone the time indicated by the watch according to the invention refers. This information is entered by moving rotatable ring 44 by means of crown 46, so that origin 47 is located opposite the value of time scale 33, corresponding to the time zone whose time is displayed by the watch.

In FIG. 4, this equation of time is determined by means of index 48, which is placed opposite the current day. The value of the adjustment to be made, provided by the intersection of index 48 with curve 50, is read on graduated scale 53. The adjustment is then entered, by moving rotatable ring 44 so that the index 48 is offset with respect to the time zone, by a value corresponding to the equation of time.

The orientation of the meridian plane, and more particularly the direction of south, is approximately defined. When the observer wishes to define the longitude of a location in which he is situated, he must also have available means allowing the sun's altitude above the horizon to be defined, so as to know the moment at which it is highest, which corresponds to the meridian passage. He may, at that moment, read the longitude on rotatable ring 44, indicated by arrow 26.

This may be achieved by placing the watch equipped with the prism device 61 as shown in FIG. 5 and oriented in the direction of the sun on a substantially plane surface. The observer can then see image 79 moving across frosted surface 78. The meridian passage corresponds to the moment at which the image stops and changes direction. He can then read, at that instant, the value indicated on rotatable ring 44 located opposite arrow 26, which corresponds to the longitude. Preferably, the prism deice 61 is associated with a wristband carrying the watch case.

If reference is made to FIG. 2, the procedure can be better understood. The situation of the different components of the watch corresponds to reading the longitude of New York. This city is located in a time zone which is 5 hours behind Greenwich mean time (GMT). The user thus places rotatable ring 44 so that origin 47 is located opposite indication −5 of time zone scale 33 carried by dial 32. The current date is 18 July. He opens the back cover 40 of his watch and places index 48 opposite this date and can thus read the equation of time which substantially corresponds to an adjustment of 1.5° (degree scale 53). The user then makes this adjustment to rotatable ring 44, so that the index of time zone scale 33 bearing the indication −5 is located opposite 1.5° of longitude scale 45.

In this position, the user places his watch on a plane surface, so that the prism device 61 of FIG. 5 is substantially oriented towards the sun. Image 79 then appears on frosted surface 78. As long as the sun is rising above the horizon, the image moves away from oblique face 66. When the sun has reached its apogee, the image 79 stops. At that moment, the user can read the longitude value, which corresponds to the indication on longitude scale 45, opposite arrow 26 of hour hand 24, i.e. 72° longitude west.

In a variant which is not shown, the dial bears a vernier scale opposite longitude scale 45, the scale divisions of which are in a ratio of 9 to 10 to define a vernier allowing precision to be improved upon entering the equation of time. A comparable solution may be used to improve the reading of longitude by using a graduated scale at the end of hand 24, replacing arrow 26.

As was explained hereinbefore, the longitude scale 45 borne by rotatable ring 44 is limited to 180°. This is due to the fact that the hour hand makes two revolutions per day. The watch thus described allows longitude to be measured between 90° west and 90° east. It is however easy also to find the longitude for the other half of the earth by taking the meridian passing through the Greenwich antipode as a reference and by adding 180° to the value measured, east longitudes being considered to be negative.

What is claimed is:

1. A watch intended for defining a location longitude, comprising a case (10) closed by a back cover (40), in which are disposed a wheel (16) completing one revolution in 12 hours and carrying an hour hand (24), a wheel (18) completing one revolution in one hour and carrying a minute hand (28), and a dial (32), characterised in that it further includes:

- a rotatable ring (44) for reading longitude, bearing an origin (47) and, therefrom, a longitude scale (45) in degrees covering 180° over the periphery of the longitude scale (45),
- in that the dial (32) is equipped with a time zone scale (33) for selecting a time zone, with a median point (35) corresponding to the top point of the dial, the time zone scale (33) covering 12 hours over the periphery of the time zone scale (33), each hour on the time zone scale (33) representing 15° on the longitude scale (45), and, when the origin (47) is aligned with the median point (35), the value of a number on the longitude scale (45) being equal to an absolute value of the opposing hour mark on the time zone scale (33); and
- a calendar indicator (54) in polar co-ordinates, with an angular indication of the months and days of the year and a radial indication in the shape of a curve (50) relative to the equation of time, and an index (48) mounted to move in rotation opposite the calendar indicator (54) and bearing a reading scale (52) for determining the equation of time.

2. A watch according to claim 1, characterised in that the longitude scale (45) in degrees, extends from 0° to 90° on either side of the origin (47) and in that the time zone scale (33) bears a graduation ranging from 0 to 6 hours or −6 hours from the median point (35), depending on the direction of rotation.

3. A watch according to claim 1, characterised in that said rotatable ring (44) encircles the dial (32) and in that the hour hand (24) is extended by an arrow (26) up to the vicinity of the longitude scale (45), which is of greater length than the minute hand (28).

4. A watch according to claim 1, characterised in that said index (48) includes two diametrically opposite arms, bearing a scale relative to the equation of time, one arm (53) bearing a scale in degrees of angle and the other arm (52) bearing a scale in minutes of time.

5. A watch according to claim 1, of the type including a case (10) with a back cover (40), characterised in that said index (48) is mounted so as to move on the back cover (40) of said case (10).

6. A watch according to claim 1, characterised in that the longitude scale (45) borne by the rotatable ring (44) includes indices defining fractions of a degree for values comprised between +50 and −5° on either side of the origin (47), to facilitate adjustment of the equation of time.

7. A watch according to claim 1, characterised in that it further includes a disc (22) completing one revolution in 24 hours, in synchronism with the hour hand (24) and bearing data relative to the cardinal points.

8. A watch intended for defining a location longitude, comprising a case (10) closed by a back cover (40), in which are disposed a wheel (16) completing one revolution in 12 hours and carrying an hour hand (24), a wheel (18) completing one revolution in one hour and carrying a minute hand (28), and a dial (32), characterised in that it further includes:

- a rotatable ring (44) for reading longitude, bearing an origin (47) and, therefrom, a longitude scale (45) in degrees covering 180° over the periphery of the longitude scale (45),
- in that the dial (32) is equipped with a time zone scale (33) for selecting a time zone, with a median point (35) corresponding to the top point of the dial, the time zone scale (33) covering 12 hours over the periphery of the time zone scale (33), each hour on the time zone scale (33) representing 15° on the longitude scale (45), and, when the origin (47) is aligned with the median point (35), the value of a number on the longitude scale (45) being equal to an absolute value of the opposing hour mark on the time zone scale (33), and
- a prism device (61) for determining the sun's altitude above the horizon including a slot (70) for defining a light ray of small section, a frosted surface (78) onto which said ray is projected.

9. A watch according to claim 8, characterised in that said prism device (61) includes a body (60) made of transparent material, of substantially prismatic shape, with two opposing substantially parallel faces (62, 64) and an oblique face (66) connecting the two opposing faces and which includes a transparent substantially central slot (70), intended to let a sun ray penetrate said body and surrounded by an opaque layer (68), wherein said opposing faces (62, 64) have layers (74, 76) arranged so as to reflect said ray, and wherein one of said layers (74) includes a frosted surface (78) on which an image (79) of the slot (70) appears, which moves as a function of the sun's altitude.

10. A watch according to claim 9, characterised in that said prism device (61) further includes a scale (80) opposite said frosted surface (78), for facilitating the evaluation of the sun's altitude.

11. A watch according to claim 9, characterised in that said prism device (61) is made of tempered plate glass or sapphire.

12. A watch according to claim 8, characterised in that it further includes a case and a wristband and in that said prism device (61) is associated with said wristband.

* * * * *